United States Patent Office 2,754,308
Patented July 10, 1956

2,754,308

METHOD OF BODYING OILS

Oliver J. Grummitt, Cleveland, Ohio, assignor to The Sherwin-Williams Company, Cleveland, Ohio, a corporation of Ohio No Drawing. Application June 21, 1952,
Serial No. 294,925

2 Claims. (Cl. 260—406)

This invention relates as indicated to a process for improving the bodying rate of drying oils and semi-drying oils. More specifically, this invention relates to the treatment of raw, degummed or alkali refined soya bean oil with acetic anhydride and then blowing the treated oil with air or other oxygen containing gas to increase the body thereof.

Viscous air blown soya bean oils have various uses including that of a plasticizer for nitrocellulose lacquers. A typical plasticizer is made by blowing soya bean oil at 52° C. until a Gardner-Holdt (G-H) viscosity of about 15 seconds is reached. The reaction time required for a commercial degummed soya bean oil varies from 300–800 hours.

It is well known that the blowing by air of drying oils and semi-drying oils depends upon reaction or reactions with oxygen. It is likewise well known that crude unrefined drying and semi-drying oils contain minor amounts of non-glyceride components which have strong anti-oxidant properties. Chemically these so-called inhibitols probably consist of tocopherols, sterols, phosphatides and possibly other substances. The presence of these anti-oxidants during oxidation by blowing greatly increases the induction period during which little apparent oxidation occurs. Until this induction period is over, there is practically no increase in viscosity by blowing. It is well known that the addition of drier materials such as lead, cobalt and manganese soaps will greatly reduce this induction period. For many purposes crude oils are refined in order to remove or reduce the concentration of these inhibitors.

Therefore, it is a principal object of this invention to provide a method whereby cheap raw or partially refined drying and semi-drying oils such as raw or degummed soya bean oil may have their blowing rate increased. It is another purpose of this invention to provide a treated soya bean oil not only having an improved blowing rate but also a lighter color.

Other objects of this invention appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

Broadly stated, then, this invention comprises a process for bodying vegetable oils which comprises heating a vegetable oil selected from the group consisting of drying and semi-drying vegetable oils with an acylating agent selected from the class of acid halides and acid anhydrides of saturated or unsaturated aliphatic carboxylic acids having from 2 to 18 carbon atoms in the acyl radical at a temperature of at least about 100° C. for a period of time of from 0.5 to 5 hours, vacuum stripping any remaining unreacted acylating agent and then intimately contacting a body of the oil so treated with a free-oxygen-containing gas.

In the practical operation of this invention, degummed or raw soya bean oil is first treated with approximately 10% by weight of an activating agent such as acetic anhydride, by refluxing for approximately 2 hours and then removing any excess anhydride by vacuum stripping. It was found that by this treatment the reaction time of blowing was reduced to approximately 60 hours. Alternatively, the anhydride may be added to the oil in a concentration of only 0.5%, the mixture heated without blowing for 2 hours at 150° C., blown while spontaneously cooling to 52° C. and continued at 52° C. By this method the time required to produce a 15 second oil is 35 to 40 hours. If the reaction temperature of 150° C. is undesirable, the mixture containing 0.5% acetic anhydride may be heated for 17 hours at 100°, then blown from 100° C. to 52° C. and blowing continued at that temperature. In this way the total reaction time or blowing time required is about 60 hours as against 300–800 hours for the oil which does not contain the anhydride. As to alkali refined soya bean oil, it is well known that it contains less anti-oxidant material which is shown by the fact that it can be blown to 15 seconds viscosity at 52° in about 100 hours. It, too, can be more readily oxidizable by the process of this invention and blowing time be reduced to 40 to 60 hours.

All of the examples of bodying by blowing use basically the temperature of 52° C. In some cases the blowing was started at 100° or at 150° C. It is believed that the accelerated bodying would be obtained if the oil were blown at any temperature between room temperature and about 150° C. The magnitude of the acceleration is probably greater the lower the blowing temperature, since heat alone has the ability to destroy anti-oxidants.

Other acylating agents besides acetic anhydride may be used. The following agents were tried at approximately 10% by weight concentration: propionic anhydride, acetyl chloride and acetic-oleic anhydride. After refluxing, if any excess agent was present, it was removed by vacuum stripping. In each case, the reaction period was considerably lessened.

The drying and semi-drying oils that can be treated as taught by this invention are those of the group of vegetable oils, such as linseed, castor, tung, oiticica, soya beam, perilla, cottonseed, safflower, etc. It is to be noted that a preferred application of this invention is in the treatment of soya bean oil since the results received with respect to this oil are of much greater magnitude and importance.

The acylating agents that may be employed in the practice of this invention are those belonging in the class consisting of acid halides and acid anhydrides of aliphatic saturated or unsaturated carboxylic acids containing from 2 to 18 carbon atoms in the acyl radical, such as acetyl chloride, propionyl bromide, butyryl chloride, acetyl fluoride, acetyl iodide, acetic anhydride, propionic anhydride, butyric anhydride, aceticoleic anhydride, etc.

The quantity of acylating agent used ranges from 0.5 to 10% by weight with respect to the oil. Larger quantities of the acylating agent to give faster reactions but it then becomes necessary to remove the excess by vacuum distillation or stripping. When the lower amount is used, that is 0.5%, there is no need to vacuum strip. For most purposes, it was found best to use 0.5 to 1% of acylating agent.

The temperature range at which the reaction may be conducted has been found to be between 100° and 200° C. This is a general range found necessary when dealing with the various oils to be treated in the manner taught by this invention. However, in the practical preferred application of this invention, temperatures of between 140° to 180° C. have been found best.

Each oil of the class or group to be treated, requires a different period of time to acquire the desired result, but in general satisfactory results are obtained when the reaction is permitted to continue from 0.5 to 20 hours.

Other modes of applying the principle of this invention may be employed instead of those specifically set forth above, changes being made as regards the details herein disclosed, provided the elements set forth in any of the following claims, or the equivalent of such be employed.

I, therefore, particularly point out and distinctly claim as my invention:

1. A process for bodying vegetable oils which comprises heating a vegetable oil selected from the group consisting of drying and semi-drying vegetable oils with from 0.5 to 10% of acetic anhydride at a temperature of from 140° to 180° C. for a period of time of from 0.5 to 20 hours, and then blowing a body of the oil so treated with air.

2. A process for bodying soya bean oil which comprises heating the said soya bean oil with from 0.5 to 10% of acetic anhydride at a temperature of from 140° to 180° C. for a period of time of from 0.5 to 20 hours, and then intimately contacting a body of the oil so treated with air.

References Cited in the file of this patent
UNITED STATES PATENTS

| | | |
|---|---|---|
| 2,072,151 | Booney | Mar. 2, 1937 |
| 2,248,965 | Corkery | July 15, 1941 |
| 2,425,200 | Nessler et al. | Aug. 5, 1947 |
| 2,497,904 | Nichols | Feb. 21, 1950 |